Patented Nov. 16, 1948

2,454,108

UNITED STATES PATENT OFFICE 2,454,108

PREPARING ORGANIC SULFIDES

Cheves T. Walling, Montclair, N. J., assignor to E. I. du Pont de Nemours & Company, Wilmington, Del., a corporation of Delaware No Drawing. Application February 16, 1944, Serial No. 522,632

10 Claims. (Cl. 260—399)

This invention relates to the preparation of organic sulfides and particularly to their preparation by the reaction of an organic mercaptan with an organic compound containing at least 1 olefinic double bond.

The preparation of organic sulfides by the reaction of a mercaptan with an organic compound containing 1 or more olefinic double bonds has been reported many times. A number of catalysts have been proposed for this reaction, which catalysts include peroxides, sulfur and various metal salts, such as the metal halides, metal sulfides and metal solenoids. It has been found that the peroxides are not always effective. The metal salts generally tend to form tarry products. When sulfur is employed as the catalyst, quite large amounts are generally required and the sulfur frequently reacts to form undesirable sulfurized products. For example, Jones and Reid, in J. Am. Chem. Soc., 60, 2452 (1932), found it necessary to employ about 16.4 mol per cent of sulfur, based upon the propylene, in the reaction of thiophenol with propylene. It has also been found that most of such catalysts give poor results when it is attempted to react mercaptans with natural fats and oils and their derivatives.

It is an object of the present invention to provide a new and improved method for the preparation of organic sulfides by the reaction of an organic mercaptan with an organic compound containing at least 1 olefinic double bond. Another object is to provide a novel catalyst for such reaction. A further object is to provide a catalyst for such reaction which catalyst is more effective than those heretofore employed and will produce higher yields of purer products. Other objects are to advance the art. Still other objects will appear hereinafter.

The above and other objects may be accomplished in accordance with my invention which comprises reacting an organic mercaptan with an organic compound containing at least 1 olefinic double bond in the presence of a small proportion of elementary selenium as the catalyst. I have found that elementary selenium is a powerful catalyst for the reaction, being effective where other catalysts, such as peroxides, are not. The elementary selenium shows less tendency to form tarry products than the metal salts. Also, the elementary selenium is effective in smaller quantities than sulfur, has less tendency to combine with the reactants or the products, and can usually be readily filtered out of the reaction product.

The organic compound, which is to be reacted with the mercaptan in accordance with my invention, may be any organic compound which contains an olefinic double bond. Such organic compound may be aliphatic, aromatic or heterocyclic and may contain non-hydrocarbon substituents, such as alcoholic hydroxyl, phenolic hydroxyl, halogen, acid, ester, ether and like groups. Preferably, the organic compound is an aliphatic compound, that is, a compound which is devoid of aromatic and heterocyclic groups. I particularly prefer that the organic compound be an ester of a long chain fatty acid, such as the unsaturated natural fats and oils and their derivatives. Another preferred class of organic compounds is the olefines, that is, the unsaturated aliphatic hydrocarbons. By a "long chain" fatty acid, I mean one which contains at least 8 carbon atoms. Amongst the compounds, which have proved to be suitable for use in my process, are simple aliphatic olefines, such as ethylene, propylene, isobutylene and di-isobutylene; cyclic olefines, such as cyclopentene, cyclohexene and the terpenes; polyolefines, such as isoprene; substituted olefines, such as allyl alcohol, crotyl halides, crotonic acids and the various unsaturated fats and oils and their derivatives; and aromatic olefinic compounds, such as styrene.

The organic mercaptan, which may be employed in accordance with my invention, may be any organic mercaptan, including aliphatic, heterocyclic and aromatic mercaptans and may contain non-hydrocarbon substituents, such as hydroxy, ether, sulfide, acid, ester, amido and amino groups. For example, the mercaptans may be mercapto alcohols, ethers, sulfides, acids, esters, amides or amines. Preferably, the mercaptan should be an aliphatic mercaptan, that is, one which is devoid of aromatic and heterocyclic groups. Also, preferably, the mercaptan should be one which, except for the sulfur of the mercapto group, consists of carbon and hydrogen. A particularly preferred class of mercaptans are the terpene mercaptans. Mercaptans, which have proved to be particularly suitable for use in the process of my invention, are simple aliphatic mercaptans, such as ethyl mercaptan, tert. butyl mercaptan and lauryl mercaptan; cyclic aliphatic mercaptans, such as cyclohexyl mercaptan and pinene mercaptan; and aromatic mercaptans, such as thiophenol, xylyl-1 mercaptan, benzyl mercaptan and the thionaphthols.

The amount of elementary selenium employed will be a catalytically small proportion, generally on the order of from about 1 mol per cent to about 10 mol per cent, based on the reactant which is present in the smallest molar proportion. For example, if an excess of the mercaptan is employed so as to insure complete conversion of the olefinic compound to the sulfide, the amount of the elementary selenium will be based on the amount of the olefinic compound.

The times and temperatures may be widely varied and will vary with the reactants employed. Generally, the conditions chosen should be as mild as possible. Temperatures of from about 150° C. to about 250° C. will generally be satisfactory. The reaction will usually be complete in from about 2 to about 48 hours.

In order to more clearly illustrate my invention, the preferred modes of carrying the same into effect and the advantageous results to be obtained thereby, the following examples are given, wherein the proportions given are in parts by weight, except where otherwise specifically indicated:

Example I 65 parts of peanut oil (consisting chiefly of the mixed glycerides of oleic, linoleic, and saturated acids and having an iodine number of about 93) and 38 parts isopropyl mercaptan were heated together in a closed steel vessel for 36 hours at 250° C. The resulting oil was heated in the open at 150° C. to drive off excess mercaptan, and hydrolyzed by shaking with an equal volume of warm 20% alcoholic potassium hydroxide solution. After dilution of the mixture with twice its volume of water, the nonacidic fraction was extracted with three portions of benzene. The acidic fraction was recovered as a yellow oil from the aqueous layer by acidification with hydrochloric acid. Analysis gave 5.91% S and an acid No. of 170.2, corresponding to 61% of isopropylmercapto acids.

When the same experiment was carried out in the presence of 0.5 part selenium (or 2.5 mol percent based upon the double bond content of the peanut oil), analysis of the product was 6.99% S and acid No. 169.4 or 72% isopropyl mercapto acids.

When a mixture of 5 parts of anhydrous ferrous chloride and 1 part benzoyl peroxide was used as the catalyst, only a black tar was obtained from which no definite product could be isolated.

Example II 170 parts (1 mol) pinene mercaptan and 310 parts (1 mol) of ethyl oleate were heated together in a closed iron vessel at 225° C. for 12 hours. Working up the reaction mixture in the manner of Example I gave, as a product, a dark yellow oil (acid No. 170.2 containing 1.84% S) corresponding to 19% pinene mercapto stearic acids. When the same experiment was carried out in the presence of 6 parts (7.6 mol percent based on the ethyl oleate) of selenium, a lighter-colored product (acid No. 122.3; 3.90% S) corresponding to 56% pinene mercapto stearic acids was obtained.

Example III 70 parts (1 mol) of pentene-2 and 170 parts (1 mol) of pinene mercaptan were heated together in a closed iron vessel for 6 hours at 225° C. Analysis of the almost colorless oil, obtained as a product, for total sulfur and mercaptan by standard methods gave 12.02% S and 11.72% —SH, which indicated that 2.5% addition had taken place. When the same reaction was carried out in the presence of 1.5 parts (1.9 mol percent) of selenium, analysis gave 12.92% S and 5.59% SH, indicating 58% addition to give amyl pinene sulfide.

Example IV 112 parts of cetene (0.5 mol) and 46 parts of n-butyl mercaptan (0.5 mol) were heated together for 12 hours at 225° C. in a closed iron vessel. Analysis of the light oil, obtained as a product, gave 8.34% S and 7.36% SH, or 14.4% addition.

When the same reaction was carried out in the presence of 1 part (2.5 mol percent) of selenium, analysis of the product gave 8.24% S and 2.84% SH, indicating 65.6% conversion to butyl cetyl sulfide.

Example V 80 parts of thiophenol and 80 parts of commercial pinene were heated 12 hours at 225° C. in a closed iron vessel in the presence of 1 part (2.8 mol percent based on pinene) of selenium. Analysis of the product gave 16.18% S and 7.42% —SH, indicating addition to give phenyl pinene sulfide to the extent of 55%.

It will be understood that the above examples are given for illustrative purposes solely and that many variations and modifications can be made therein, particularly in the reactants, the proportions of the components and the conditions employed, without departing from the spirit or scope of my invention. Accordingly, my invention is not to be limited to the specific embodiments given in the examples but I intend to cover my invention broadly as in the appended claims.

It will be apparent from the above disclosure that I have provided a novel and improved process employing a newly discovered and more effective catalyst for the reaction wherein higher yields of purer products are readily obtained and wherein the disadvantages of previously known catalysts have been overcome. The use of elementary selenium is particularly advantageous when one or both of the reactants is of high molecular weight, that is, contains 8 or more carbon atoms, as, with such reactants, the reaction is very slow in the absence of a catalyst and previously proposed catalysts generally give poor results.

The sulfides, obtained by my process, have many uses which depend largely upon the presence or absence and character of other functional groups. For example, aromatic-aliphatic amino and other substituted thioethers are useful as dye intermediates. Salts of alkyl mercapto acids have been proposed as additives for oils and for incorporation in paint dryers.

I claim:

1. The method of preparing organic sulfides which comprises reacting an organic mercaptan which, except for the sulfur of the mercapto group, consists of carbon and hydrogen with an aliphatic ester of a long chain fatty acid containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

2. The method of preparing organic sulfides which comprises reacting an organic mercaptan which, except for the sulfur of the mercapto group, consists of carbon and hydrogen with an unsaturated natural fatty oil in the presence of elementary selenium in a proportion of from about 1 mol per cent to about 10 mol per cent based on the reactant which is employed in the smallest molar quantity in a closed vessel at temperatures of from about 150° C. to about 250° C.

3. The method of preparing organic sulfides which comprises reacting an organic mercaptan which, except for the sulfur of the mercapto group, consists of carbon and hydrogen with an aliphatic compound containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

4. The method of preparing organic sulfides which comprises reacting pinene mercaptan with an aliphatic compound containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

5. The method of preparing organic sulfides which comprises reacting an aliphatic mercaptan which, except for the sulfur of the mercapto group, consists of carbon and hydrogen with an aliphatic compound containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

6. The method of preparing organic sulfides which comprises reacting a terpene mercaptan with an aliphatic compound containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

7. The method of preparing organic sulfides which comprises reacting a terpene mercaptan with an aliphatic hydrocarbon containing at least one olefinic double bond in the presence of elementary selenium in a proportion of from about 1 mol per cent to about 10 mol per cent based on the reactant which is employed in the smallest molar quantity in a closed vessel at temperatures of from about 150° C. to about 250° C.

8. The method of preparing amyl pinene sulfide which comprises reacting pinene mercaptan with pentene-2 in the presence of elementary selenium in a proportion of from about 1 mol per cent to about 10 mol per cent based on the reactant which is employed in the smallest molar quantity in a closed vessel at temperatures of from about 150° C. to about 250° C.

9. The method of preparing pinene mercapto stearic acids which comprises reacting pinene mercaptan with ethyl oleate in the presence of elementary selenium in a proportion of from about 1 mol per cent to about 10 mol per cent based on the reactant which is employed in the smallest molar quantity in a closed vessel at temperatures of from about 150° C. to about 250° C.

10. The method of preparing butyl cetyl sulfide which comprises reacting n-butyl mercaptan with cetene in the presence of elementary selenium in a proportion of from about 1 mol per cent to about 10 mol per cent based on the reactant which is employed in the smallest molar quantity in a closed vessel at temperatures of from about 150° C. to about 250° C.

CHEVES T. WALLING.

REFERENCES CITED

The following references are of record in the file of this patent:

UNITED STATES PATENTS

| Number | Name | Date |
|---|---|---|
| 2,035,121 | Frolich | Mar. 24, 1936 |
| 2,051,807 | Allen | Aug. 25, 1936 |
| 2,211,990 | Shoemaker et al. | Aug. 20, 1940 |

OTHER REFERENCES

Chemical Reviews, 1942; vol. 27; pp. 388–394; Mayo et al.